March 17, 1931.  R. E. SCHULER  1,796,409

CABLE CLAMP

Filed Aug. 10, 1929

Inventor
Robert E. Schuler
By Johnston & Jennings
Attorneys

Patented Mar. 17, 1931

1,796,409

UNITED STATES PATENT OFFICE

ROBERT E. SCHULER, OF BIRMINGHAM, ALABAMA, ASSIGNOR TO ANDERSON BRASS WORKS, INC., A CORPORATION OF ALABAMA

CABLE CLAMP

Application filed August 10, 1929. Serial No. 384,957.

My invention relates to cable clamps and particularly to clamps wherein it is desired to make a good electrical connection between two cable members and has for its object the provision of a device of the character designated which shall be simple of design and effective for the purpose set forth.

Another object of my invention is to provide a cable clamp providing cooperating cable members adapted to draw the elements to be clamped tightly together in a line contact.

Briefly, my invention comprises a U-shaped member having slots in the sides thereof adapted to hold the cables to be clamped in side by side relation. A second slotted member fits between the sides of the U-shaped member and a threaded bolt formed on the end of the second slotted member extends through a closed portion of the U-shaped member whereby the two may be drawn tightly together and the cables to be clamped squeezed in a line contact between the two members. Where the cables to be clamped are already strung or where it would be more convenient to apply the clamp after the cables are in place, I provide the U-shaped member and the second slotted member with open slots adapted to be placed in cooperative relation around the cables.

Devices embodying features of my invention are illustrated in the accompanying drawings forming a part of this application, wherein Fig. 1 is a plan view of one form of my invention and showing it as clamping two cables together;

Figure 3:
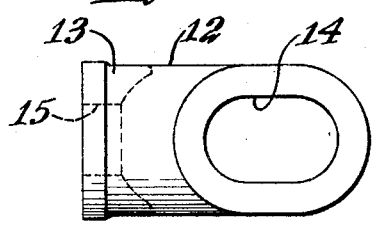
Figs. 3 and 4 show the clamp herein separated.
Figure 4:
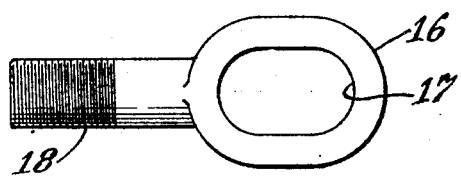
Figure 5:
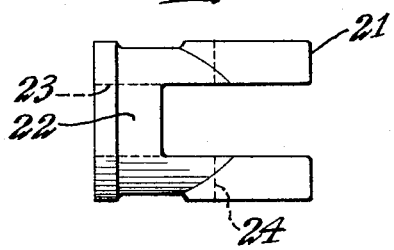
Figure 6:
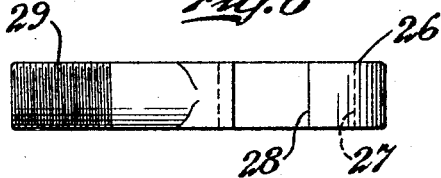
Figure 7:
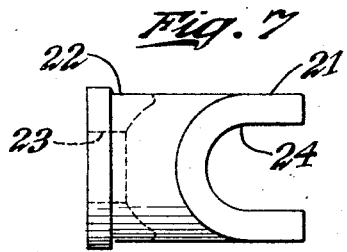
Figure 8:
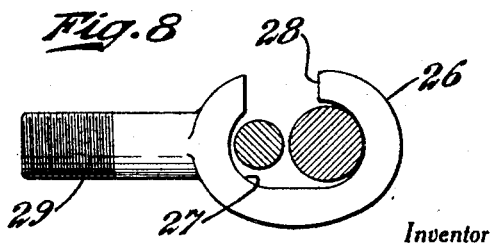

Figs. 5 and 6 are views corresponding to Figs. 3 and 4 and showing a modified form of my invention in side elevation; and Figs. 7 and 8 are views showing the elements of Figs. 5 and 6 in plan.

Figure 1:
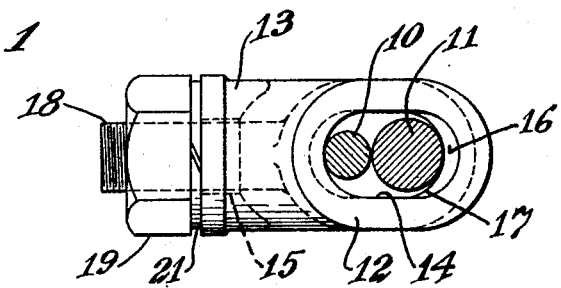

Referring to the drawings for a better understanding of my invention I show in Fig. 1 cables, or other similar members to be clamped together, 10 and 11. Embracing the cables is a U-shaped member 12 having its closed end at 13 and provided in its side with elongated slots 14 through which the members 10 and 11 pass. The closed end 13 of the member 12 is provided with a bolt hole 15. Fitting loosely between the sides of the U-shaped member 12 is a second member 16 provided with an elongated slot 17, similar to the slots 14 in the member 12. Carried by the end of the member 16 is a threaded bolt 18 adapted to pass through the hole 15 and on which screws a nut 19 which is held in place by a lock washer 21.

It may be seen from the drawings that the slots 14 and 17 are so formed as to hold the members 10 and 11 in side by side relation and when the nut 19 is tightened down the member 16 is drawn toward the end 13 of the member 12 thereby pulling the members 10 and 11 into tight engagement with each other in a relatively long line of contact.

Figure 2:
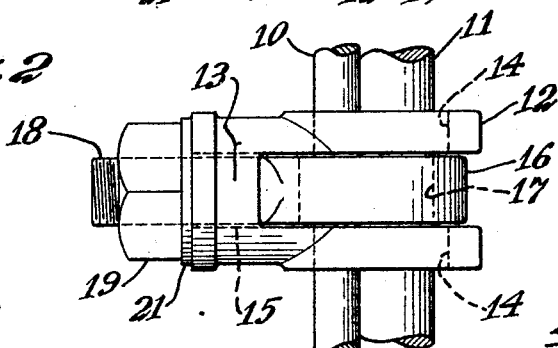
Fig. 2 is a side elevation of same.

Referring now to Figs. 6 to 8 inclusive, I show a modified form of my invention adapted for clamping cables together after they are in place or which may be used where it is inconvenient to thread the members 12 and 16 onto the cable. In accordance with this form of my invention, I provide a U-shaped member 21 having a closed end 22 provided with a bolt hole 23. The member 21 is provided in its sides with slots 24 which are open at the end whereby the member may be clasped around the cables. Cooperating with the member 21 is a second member 26 having a slot 27 therein conforming in width to the slots 24 and having an opening 28 in the side thereof whereby it may be hooked around the cables to be clamped. Formed on the ends of the member 26 is a threaded bolt 29 which is adapted to pass through the bolt hole 23 and cooperate with members 19 and 21 in a manner already described for Figs. 1, 2 and 4, inclusive.

From the foregoing it will be apparent that I have devised an improved cable clamp which is simple of design, construction and capable of effectively holding cables in line contact.

While I have shown my invention in but one form, it will be obvious to those skilled in the art that it is not so limited but is susceptible of various changes and modifications without departing from the spirit thereof, and I desire therefore that only such limitations shall be placed thereupon as are imposed by the prior art or as are specifically set forth in the appended claim.

What I claim is:

A cable clamp comprising a U-shaped member having a bolt hole through its closed end and having its sides defining elongated slots open at the ends for confining a pair of cables to be clamped together, a second slotted member having a side opening and fitting between the sides of the U-shaped member and also adapted, in cooperation with the slots of the U-shaped member to confine the cables to be clamped, a threaded bolt formed on one end of the second slotted member and projecting through the bolt hole of the U-shaped member, and a nut and lock washer engaging the threaded end of said bolt.

In testimony whereof I affix my signature.

ROBERT E. SCHULER.